May 31, 1932.  E. G. GUNN  1,861,390
VIBRATION DAMPENER FOR CRANK SHAFTS
Original Filed June 10, 1929
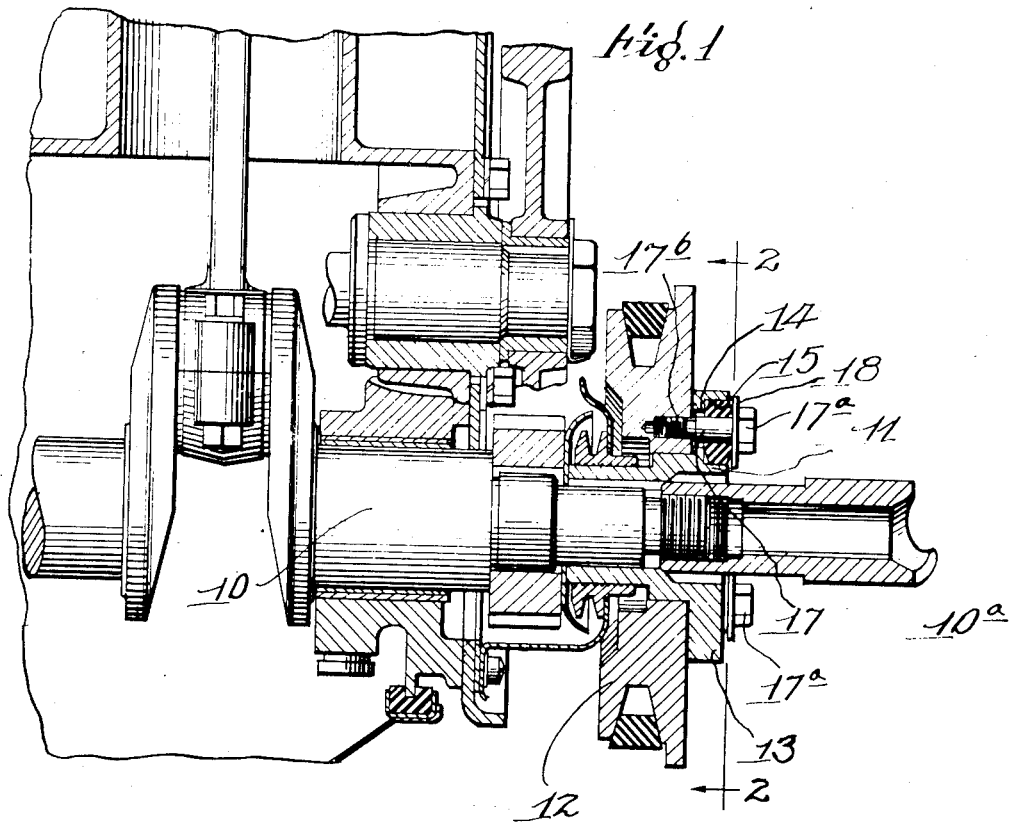
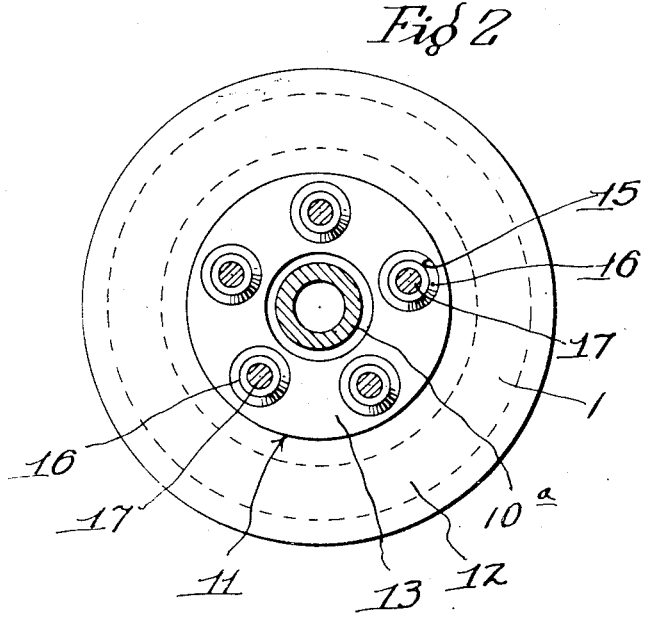
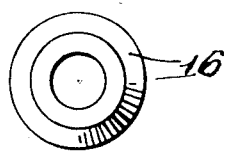
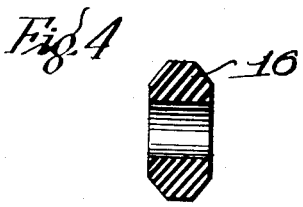
Inventor
Earl G. Gunn
Attorneys Patented May 31, 1932

1,861,390

UNITED STATES PATENT OFFICE

EARL G. GUNN, OF DETROIT, MICHIGAN, ASSIGNOR, BY MESNE ASSIGNMENTS, TO PACKARD MOTOR CAR COMPANY, OF DETROIT, MICHIGAN, A CORPORATION OF MICHIGAN

VIBRATION DAMPENER FOR CRANK SHAFTS

Application filed June 10, 1929, Serial No. 369,761. Renewed October 21, 1931.

This invention relates to improvements in vibration dampeners for crank shafts of internal combustion motors, and has for its principal object to provide an improved construction for devices of the character described.

Various constructions have been heretofore proposed and utilized for yieldingly mounting a flywheel on a crankshaft in order to minimize the effect of excessive vibrations at certain speeds, usually ascribed to coupling of natural periods of vibration of certain moving parts of the motor. Many of these constructions depend upon spring tension and yielding friction devices, and are more or less complicated, requiring a relatively large number of parts.

In carrying out my present invention, I provide an improved and simplified dampener construction, requiring a relatively small number of parts, and wherein much of the dampening action is effected through the medium of an elastic composition, preferably rubber, which has well defined advantages over spring tension means, as will hereinafter more fully appear.

The invention may best be understood by reference to the accompanying drawings, in which Figure 1 is a fragmentary sectional view of a motor, taken axially of the crankshaft, and embodying one form of my invention.

Figure 2 is a sectional view taken on line 2—2 of Figure 1.

Figure 3 and Figure 4 are detailed front and side views, respectively, of the elastic inserts.

Referring to details of the embodiment of my invention illustrated in the drawings, a crank shaft is indicated at 10, and is provided with a hub 11 on which an inertia member or flywheel 12 is yieldably mounted to afford the desired dampening effect by permitting limited rotation of said flywheel relative to said crank shaft. The hub 11 is suitably retained on the end of the crank shaft, as by a sleeve 10a which herein is the starting crank connection, threaded on said crank shaft.

In the form shown, the flywheel 12 has bearing against a flanged portion 13 of hub 11. The latter part is provided with a plurality of apertures 14, each of which has a countersunk recess 15 for receiving a disc 16 of elastic composition, preferably rubber. Said discs fit snugly in their respective recesses and project slightly beyond the surface of the flywheel as shown. A stud 17 extends through each of the discs 16, and washers 18, 18 are interposed between each stud head 17a and the outer face of its respective disc. Said studs are each secured to the flywheel 12 as by a threaded end 17b. Said studs have clearance in the apertures 14, so as to permit limited relative rotation of said flywheel and hub. The studs 17 are tightened so as to place the discs 16 under compression and thus hold the flywheel in frictional engagement against the flange.

With the construction described, the desired damping action is provided through lateral yielding of the rubber discs, together with frictional yielding between the flywheel and the flanged part of the hub which it engages. The rubber discs provide relatively great initial deflection of the two parts, under initial or relatively small loads, but afford relatively greater resistance to deflection as the load increases, since rubber does not follow Hooke's law in this respect. Thus in the present construction, the yielding action is controlled by the deflection of the rubber discs, and the relative frictional movement between the flywheel and hub.

Although I have illustrated and described the particular embodiment of my invention, it will be understood that I do not wish to be limited to the exact construction shown and described, but that various changes and modifications may be made without departing from the spirit and scope of my invention.

I claim as my invention:

1. A vibration dampener comprising a crank shaft having a hub, a flywheel, said hub having a plurality of countersunk recesses on the side opposite said flywheel, and connecting apertures extending axially thereof, rubber inserts seated in said recesses, and studs extending through said inserts and apertures and having their inner ends secured to said flywheel, said studs fitting loosely in said apertures to permit limited relative rotation of said flywheel and hub.

2. A vibration damper comprising a crank shaft having a hub with a radially disposed flange, said flange having axially disposed apertures with countersunk recesses, an inertia member journaled on said hub in contact with said flange, axially disposed studs carried by the inertia member and projecting through said apertures, a rubber insert seated in each recess and closely embracing the stud therein, and means cooperating with the studs to compress said inserts in the recesses to urge the inertia member into frictional engagement with the flange.

3. In a vibration damper for crank shafts, the combination with an inertia member mounted for oscillation with respect to the shaft, of means for elastically connecting said inertia member to said shaft, said means including a member rotating with said shaft, one of said members being provided with a recess, an element of resilient material and of decreased thickness adjacent the periphery thereof positioned in said recess, means carried by the other of said members engaging said resilient element, and means for engaging said element adjacent the portion of greater thickness to compress the same.

4. In a vibration damper for crank shafts, the combination with an inertia member mounted for oscillation with respect to the shaft, of means for elastically connecting said inertia member to said shaft, said means including a member rotating with said shaft, one of said members being provided with a substantially circular recess, an annular resilient element decreasing in thickness toward the periphery thereof seated within said recess, a stud carried by the other of said members and projecting within said annular element, and means engaging said annular element adjacent the central thicker portion thereof to compress the same.

5. In a vibration damper for crank shafts, the combination with an inertia member mounted for oscillation with respect to the shaft, of means for elastically connecting said inertia member to said shaft, said means including a member rotating with said shaft, one of said members being provided with a substantially circular recess, an annular resilient element decreasing in thickness toward the periphery thereof seated within said recess, and a stud threaded in the other of said members and extending through said annular element, said stud having means engaging the thicker portion of said annular element, whereby the degree of compression of said element may be adjusted.

Signed at Racine, this 7th day of June, 1929.

EARL G. GUNN.